(12) United States Patent
Meyre et al.

(10) Patent No.: US 9,042,020 B2
(45) Date of Patent: May 26, 2015

(54) HEAD-UP DISPLAY SYSTEM WITH OPTICAL COMBINER COMPRISING A REMOVABLE SUN VISOR

(71) Applicant: Thales, Neuilly sur Seine (FR)

(72) Inventors: Nicolas Meyre, Saint Aubin de Medoc (FR); Erick Moreaud, Pessac (FR); Maxime Rooryck, Cestas (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 13/852,996

(22) Filed: Mar. 28, 2013

(65) Prior Publication Data
US 2013/0329302 A1   Dec. 12, 2013

(30) Foreign Application Priority Data
Mar. 29, 2012   (FR) .................................... 12 00943

(51) Int. Cl.
G02B 27/14   (2006.01)
G02B 27/01   (2006.01)
B60R 11/02   (2006.01)
B60R 11/00   (2006.01)

(52) U.S. Cl.
CPC ............ G02B 27/0149 (2013.01); G02B 27/01 (2013.01); G02B 2027/0118 (2013.01); B60R 11/0229 (2013.01); B60R 2011/0035 (2013.01)

(58) Field of Classification Search
USPC .............................. 345/7–9; 359/13, 630, 632
See application file for complete search history.

(56) References Cited

U.S. PATENT DOCUMENTS

| | | | |
|---|---|---|---|
| 4,711,512 A | 12/1987 | Upatnieks | |
| 5,007,711 A | 4/1991 | Wood et al. | |
| 5,822,126 A * | 10/1998 | Cursolle et al. | ............... 359/630 |
| 7,893,890 B2 | 2/2011 | Kelly et al. | |
| 2005/0140573 A1* | 6/2005 | Riser et al. | ......................... 345/7 |

FOREIGN PATENT DOCUMENTS

EP     0 500 378 A1   8/1992
JP     5 104980 A     4/1993

OTHER PUBLICATIONS

French Search Report for Counterpart French Patent Application No. 1200943, 6 pgs. (Sep. 3, 2012).

* cited by examiner

*Primary Examiner* — Mahidere Sahle
(74) *Attorney, Agent, or Firm* — Blakely, Sokoloff, Taylor & Zafman LLP

(57) ABSTRACT

The general field of the invention is that of the display systems comprising an optical combiner and a removable sun visor. The optical combiner is a semi-reflecting plate and the sun visor is a thin, thick and tinted plate, the sun visor comprising means for mechanically fastening on the optical combiner. The optical combiner comprises, on a first side, a first mechanical piece and, on a second side opposite to the first side, a second mechanical piece, the optical sun visor comprises, on a first side, a third mechanical piece and, on a second side opposite to the first side, a fourth mechanical piece in the form of a clip, the third mechanical piece being able to be sunk into the first mechanical piece so as to form a hinge, the rotation axis of which is parallel to the first side of the optical combiner, the fourth mechanical piece being able to be clipped into the third mechanical piece so as to lock the sun visor on the combiner.

3 Claims, 4 Drawing Sheets

FITTING    LOCKING

HEAD-UP DISPLAY SYSTEM WITH OPTICAL COMBINER COMPRISING A REMOVABLE SUN VISOR

BACKGROUND OF THE INVENTION

1. Field of the Invention

The field of the invention is that of the so-called "head-up" display systems comprising a removable sun visor. These systems are called "head-up displays" or "HUD". These systems are mainly used in aeronautics.

A so-called "head-up" display system essentially comprises a display, an optical system and an optical element called optical combiner or optical mixer. The optical combiner is generally a semi-reflecting planar or curved glass plate. The assembly makes it possible to give the user a collimated image superimposed on the outside landscape. In the case of aeronautical applications, when the display system is mounted inside an aircraft cockpit, this image may include a variety of information on the piloting or the navigation of the aircraft.

2. Description of the Prior Art

In certain sunlight conditions, it is necessary to reduce the brightness of the outside landscape so as to retain sufficient contrast in the image displayed, the brightness of the image necessarily being limited by the performance levels of the displays. The simplest way to proceed is to add a removable "sun visor" en the face of the combiner situated between the combiner and the sun visor of the appliance. The "sun visor" is a curved thin plate, transparent and tinted.

SUMMARY OF THE INVENTION

Currently, the sun visor is fastened by means of a number of fastening systems situated on the perimeter of the sun visor. The operation which is performed by the pilot takes a certain time and requires both his hands.

The system for fastening a sun visor on an optical combiner according to the invention does not present these drawbacks. It comprise only two fastening attachments and makes it possible to mount, position and fasten the sun visor in single, quick operation requiring the use of only one hand, which represents a significant advance compared to the existing systems.

More specifically, the subject of the invention is a display system comprising an optical combiner and a removable optical sun visor, the optical combiner being a semi-reflecting optical plate ensuring the superimposition of an image from the display system on an outside landscape, the sun visor being a thin, and tinted optical plate, the sun visor comprising means for mechanically fastening on the optical combiner making it possible either to hold it on the optical combiner or remove it, wherein, the optical combiner and the sun visor being of similar shape and substantially rectangular, the optical combiner comprises, on a first side, a first mechanical piece and, on a second side opposite to the first side, a second mechanical piece, the optical sun visor comprises, on a first side, a third mechanical piece and, on a second side opposite to the first side, a fourth mechanical piece in the form of a clip, the third mechanical piece being able to be sunk into the first mechanical piece so as to form a hinge, the rotation axis of which is parallel to the first side of the optical combiner, the fourth mechanical piece being able to be clipped into the second mechanical piece.

Advantageously, the first mechanical piece comprises, at each of these two ends, a hollow part, cylindrical of revolution, comprising a lateral opening, and the third mechanical piece comprises, at each of its two ends, an axis in the form of a cylinder of revolution of the same diameter as the cylindrical hollow parts of the first mechanical piece, each axis of the third mechanical piece comprising two parallel cut flats, the two axes of the third mechanical piece are arranged in such a way as to penetrate into the opening of the corresponding hollow part of the first mechanical piece, then to allow the rotation of the sun visor about a rotation axis parallel to the first side of the optical combiner until the fourth mechanical piece is clipped into the second mechanical piece, securing the sun visor in the locked position.

Advantageously, the second mechanical piece comprises a central groove in which the fourth mechanical piece is clipped, said groove being surrounded by two oblique guiding and centring cut flats.

BRIEF DESCRIPTION OF THE DRAWINGS

The invention will be better understood, and other advantages will become apparent, on reading the following description, given as a nonlimiting example, and by virtue of the appended figures in which.

DETAILED DESCRIPTION

The mechanical mounting according to the invention of a removable sun visor on the optical combiner of a head-up display system comprises two main parts which are, on the one hand, a first set of two mechanical pieces forming a hinge and, on the other hand, a second set of two mechanical pieces constituting a locking mechanism by clipping. There are numerous variants that make it possible to produce these mechanical functions. As a nonlimiting example, FIGS. 1 to 7 represent one possible mechanical embodiment of these fastening functions.

As has been stated, a so-called "head-up" display system essentially comprises a display, an optical system and an optical element called optical combiner or optical mixer. Generally, the assembly consisting of the display and of the optical system, also called optical relay, is mounted in a common mechanical system and the combiner is linked to this mechanical system by means of one or two link arms. In the case of an installation in an aircraft cockpit, this display-optical relay assembly can be mounted either in the dome light, or in the dashboard. In all cases, the combiner is placed in the central visual field of the pilot and it is important for the mechanical link means between the combiner and the rest of the display system to present visual masks which are as weak as possible.

Figure 1:
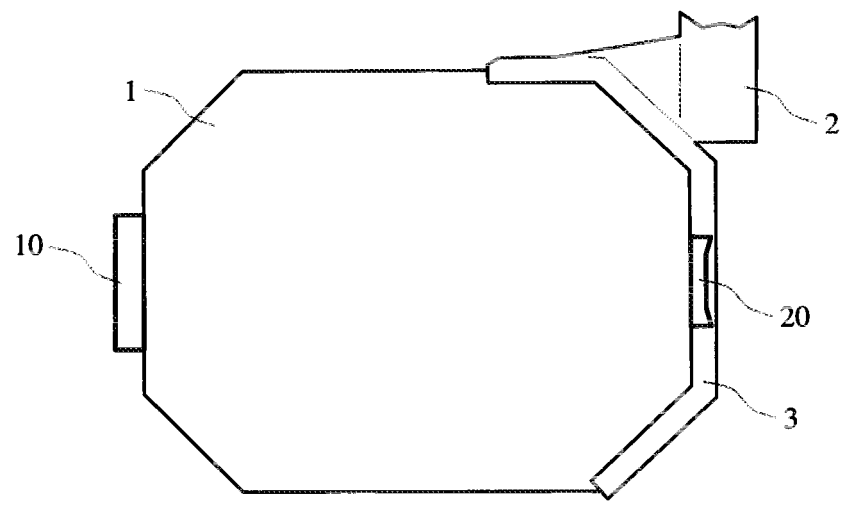
FIG. 1 represents a front view of an optical combiner according to the invention.

FIG. 1 represents a front view of an optical combiner 1 according to the invention. It is attached by a mechanical arm 2 to the rest of the head-up display system. Only the end of the mechanical arm linked to the combiner is represented in FIG. 1. This arm comprises a support 3 in which the combiner is fastened. The combiner 1 is generally an optical plate of small thickness, planar or curved and of substantially rectangular form. In FIG. 1, the corners of the rectangle are cut. The combiner 1 comprises, on a first side, a first mechanical piece 10 and, on a second side opposite to the first side, a second mechanical piece 20. In FIG. 1, these mechanical sun visor fastening pieces are arranged on the right and left lateral sides of the combiner. They could be on the top and bottom sides of the combiner.

Figure 2:
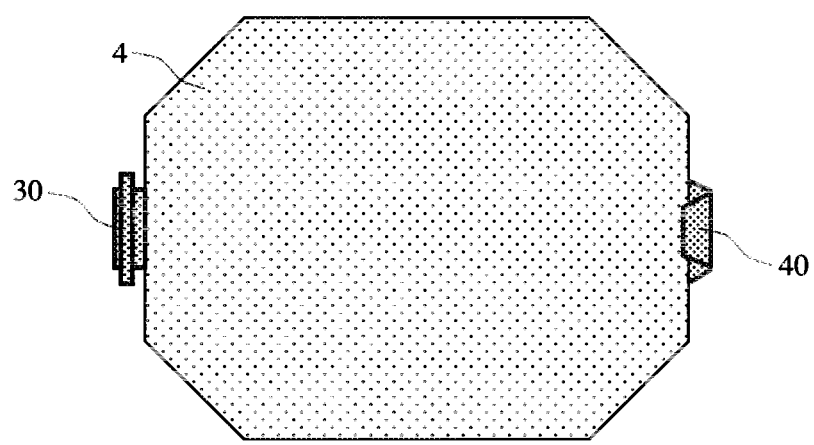
FIG. 2 represents a front view of an optical sun visor according to the invention matched to the optical combiner of FIG. 1.

FIG. 2 represents a front view of a sun visor 4 associated with the combiner 1 of FIG. 1. The latter is a curved thin plate, transparent and tinted. Its shape and its curvature are matched to those of the combiner 1. The sun visor 4 comprises, on a first side, a third mechanical piece 30 and, on a second side opposite to the first aide, a fourth mechanical piece 40.

Figure 3:
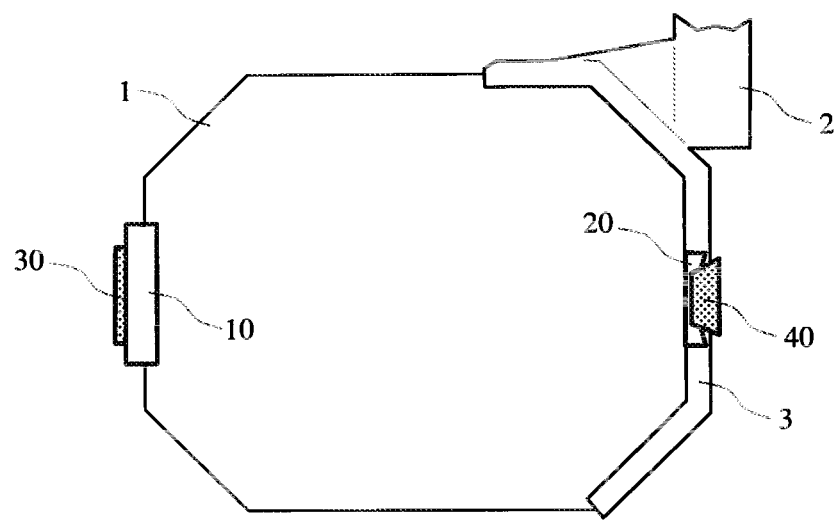
FIG. 3 represents a front view of an assembly comprising the optical combiner of FIG. 1 provided with the sun visor of FIG. 2.

FIG. 3 represents a front view of an assembly comprising the optical combiner 1 of FIG. 1 provided with the sun visor 4 of FIG. 2. The third mechanical piece 30 is sunk into the first mechanical piece 10 so as to form a hinge, the rotation axis of which is parallel to the first side or the optical combiner 1. The fourth mechanical piece 40 is clipped into the second mechanical piece 20.

Figure 4:
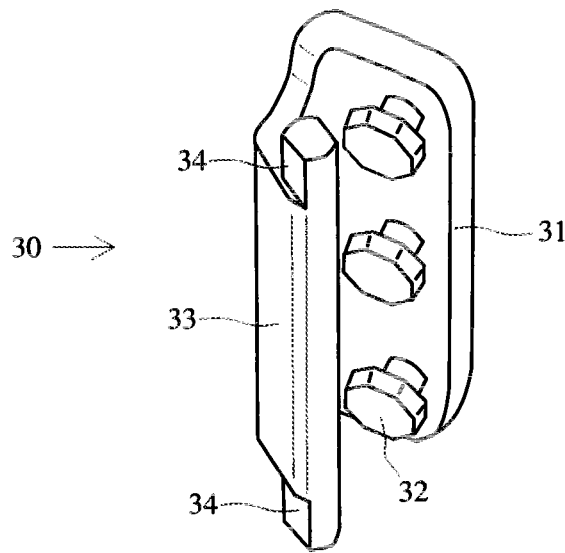
FIG. 4 represents a perspective view of a third mechanical piece linked to the sun visor.

FIG. 4 represents a perspective view of the third mechanical piece 30 linked to the sun visor. It essentially comprises two main parts which are as follows:

A first part 31 which links the piece 30 to the sun visor 4. In FIG. 4, as an indication, the link is obtained by means of three posts 32.

A second part 33 comprising, at its end, two identical mechanical axes 34 arranged in the extension of one another. Each axis 34 is in the form of a cylinder of revolution and comprises two mutually parallel cut flats.

Figure 5:
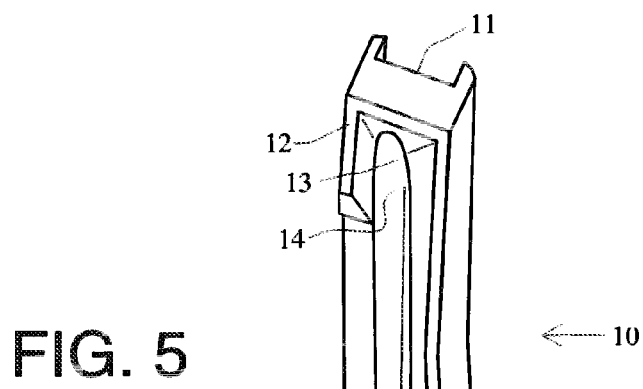
FIG. 5 represents a perspective view of a first mechanical piece linked to the combiner.

FIG. 5 represents a perspective view of the first mechanical piece 10 linked to the combiner. It takes the form of a parallelepiped. One of the faces 11 of the parallelepiped is fastened onto the edge of the combiner. The opposite face 12 includes a cavity. Each end of this cavity includes a hollow part 13, cylindrical of revolution, comprising a lateral opening 14. The cylindrical parts of the cavity are substantially of the same diameter as the axes 34.

When the sun visor 4 is fastened on the combiner 1, the axes 34 are embedded in the hollow parts 13 so as to allow the rotation of the sun visor 4 about a rotation axis parallel to the first aide of the optical combiner 1 until the fourth mechanical piece 40 is clipped into the second mechanical piece 20, securing the sun visor in the locked position, thus preventing any movement of the sun visor.

Figure 6:
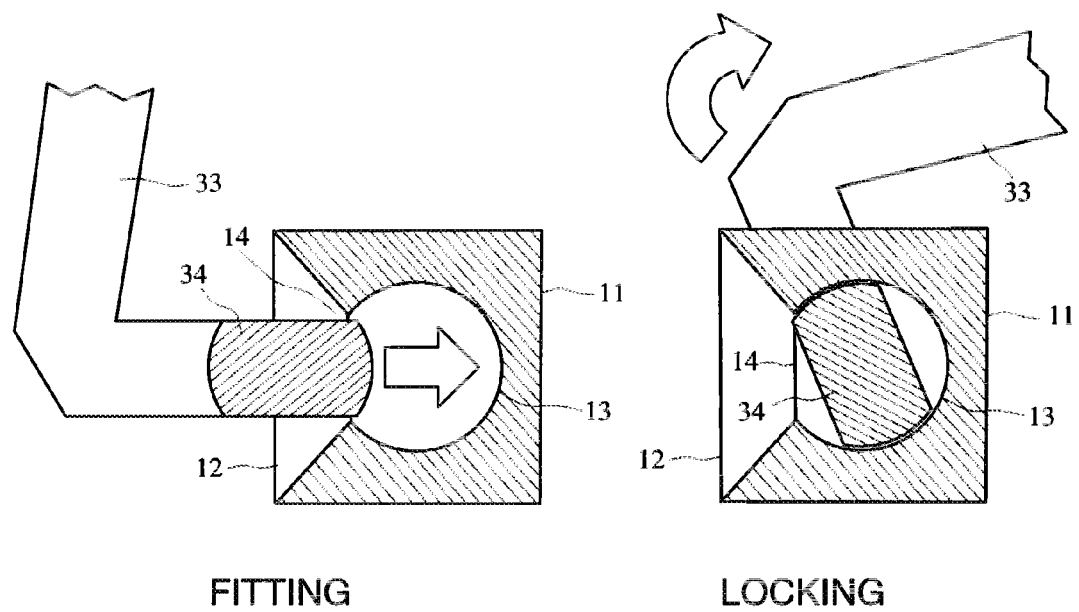
FIG. 6 represents a cross-sectional view of the mechanism for assembling the third mechanical piece in the first mechanical piece.

FIG. 6 is a cross-sectional view on the axes 34 and the hollow parts 13 showing these two fitting and locking steps. The white arrows indicate the type of movement performed by the user.

Figure 7:
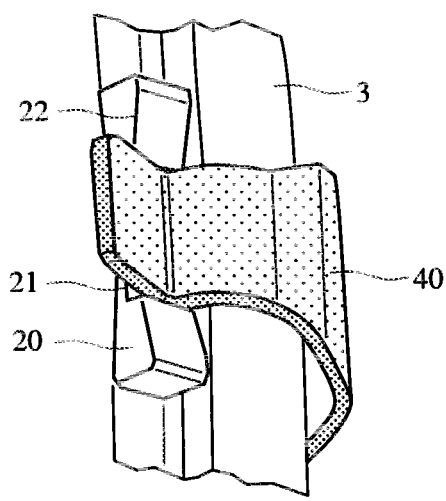
FIG. 7 represents a perspective view of the assembly, after clipping, of the fourth mechanical piece in the second mechanical piece.

FIG. 7 represents a perspective view of the assembly, after clipping, of the fourth mechanical piece 40 in the second mechanical piece 20. The second mechanical piece includes a central groove 21 into which the fourth mechanical piece is clipped, said groove being surrounded by two oblique guiding and centring cut flats 22. This second mechanical piece also makes it possible to hold in place the sun visor which is subject to a vertical stress when the latter is fastened on the optical combiner.

The advantages of the fastening system according to the invention over the systems of the prior art are essentially the simplicity with which the various mechanical pieces can be produced and mounted, the introduction of a reduced usual mask in the field of vision of the user, the ease with which the sun visor can be mounted, for which the fitting on the combiner can be done by just one hand, the great robustness of the fastening to the vibratory environments which can be severe in an aircraft.

This solution also makes it possible to have an identical definition of the "sun visor" for mounting on the relay lenses of the pilot and of the co-pilot if the latter have a symmetrical definition relative to the plane of symmetry of the aeroplane.

What is claimed is:

1. A Head-up Display system comprising:
a display-optical relay assembly comprising a display and an optical relay;
an optical combiner; and
a removable optical sun visor, wherein:
the display-optical relay assembly is mounted in a common mechanical system,
the optical combiner is linked to the common mechanical system using at least one link arm,
the head-up display system is mounted in a cockpit of an aircraft,
the common mechanical system is mounted in at least one of a dome light or a dashboard of the cockpit,
the optical combiner is placed in a central visual field of a pilot of the aircraft,
the optical combiner is a semi-reflecting optical plate that superimposes an image of the head-up display system on a landscape outside the aircraft,
the removable optical sun visor is an optical plate that is thin and tinted,
the removable optical sun visor comprises one or more mechanical fasteners to fasten the removable optical sun visor to the optical combiner or to unfasten the removable optical sun visor from the optical combiner,
the fastening or unfastening is performed in a single operation performed by one hand of the pilot,
the optical combiner and the removable optical sun visor are similar in shape and substantially rectangular,
a first side of the optical combiner comprises a first mechanical piece,
a second side of the optical combiner that is opposite to the first side of the optical combiner comprises a second mechanical piece,
a first side of the removable optical sun visor comprises a third mechanical piece,
a second side of the removable optical sun visor that is opposite to the first side of the removable optical sun visor comprises a fourth mechanical piece formed as a clip,
the third mechanical piece is to be sunk into the first mechanical piece to form a hinge,
a rotation axis of the hinge is parallel to the first side of the optical combiner,
the fourth mechanical piece is to be clipped into the second mechanical piece and,
when the fourth mechanical piece is clipped into the second mechanical piece, the removable optical sun visor is in a locked position that immobilizes the removable optical sun visor.

2. The Head-up Display system of claim 1, wherein:
each of two ends of a cavity of the first mechanical piece comprises a hollow part that is cylindrical of revolution,
each hollow part of the first mechanical piece comprises a lateral opening,
each of two ends of the third mechanical piece comprises an axis that is formed as a cylinder of revolution,
each axis of the third mechanical piece has a diameter that is equal to a diameter of the cylindrical hollow parts of the first mechanical piece,
each axis of the third mechanical piece comprises two parallel cut flats,
each of the two axes of the third mechanical piece is arranged to penetrate into the opening of the corresponding hollow part of the first mechanical piece to allow a rotation of the removable optical sun visor about a rotation axis that is parallel to the first side of the optical combiner until the fourth mechanical piece is clipped into the second mechanical piece.

3. The Head-up Display system of claim 1, wherein:
the second mechanical piece comprises a central groove into which the fourth mechanical piece is clipped, and
the groove is surrounded by two oblique guiding and centring cut flats.

* * * * *